(12) United States Patent
Black et al.

(10) Patent No.: US 7,047,457 B1
(45) Date of Patent: May 16, 2006

(54) TESTING OF A MULTI-GIGABIT TRANSCEIVER

(75) Inventors: William C. Black, Ames, IA (US); Charles W. Boecker, Ames, IA (US); Eric D. Groen, Ankeny, IA (US)

(73) Assignee: Xilinx, Inc., San Jose, CA (US)

( * ) Notice: Subject to any disclaimer, the term of this patent is extended or adjusted under 35 U.S.C. 154(b) by 403 days.

(21) Appl. No.: 10/659,916

(22) Filed: Sep. 11, 2003

(51) Int. Cl.
*G01R 31/28* (2006.01)

(52) U.S. Cl. ............... 714/712; 375/219; 375/224

(58) Field of Classification Search ............ None
See application file for complete search history.

(56) References Cited

U.S. PATENT DOCUMENTS

| | | | | |
|---|---|---|---|---|
| 5,481,563 A | * | 1/1996 | Hamre | 375/226 |
| 5,633,813 A | * | 5/1997 | Srinivasan | 703/14 |
| 6,341,142 B1 | * | 1/2002 | Ducaroir et al. | 375/219 |

OTHER PUBLICATIONS

U.S. Appl. No. 10/660,234, filed Sep. 11, 2003, Boecker.
U.S. Appl. No. 10/660,449, filed Sep. 11, 2003, Cory et al.
U.S. Appl. No. 10/660,191, filed Sep. 11, 2003, Kryzak et al.
U.S. Appl. No. 10/660,062, filed Sep. 11, 2003, Groen et al.
U.S. Appl. No. 10/660,448, filed Sep. 11, 2003, Groen et al.
U.S. Appl. No. 10/659,803, filed Sep. 11, 2003, Black et al.
U.S. Appl. No. 10/659,819, filed Sep. 11, 2003, Groen et al.
U.S. Appl. No. 10/659,971, filed Sep. 11, 2003, Boecker et al.
U.S. Appl. No. 10/660,254, filed Sep. 11, 2003, Groen et al.
U.S. Appl. No. 10/661,016, filed Sep. 11, 2003, Groen et al.

(Continued)

*Primary Examiner*—Phung My Chung
(74) *Attorney, Agent, or Firm*—Timothy W. Markison; Justin Liu

(57) ABSTRACT

A method for testing a multi-gigabit transceiver begins by configuring the multi-gigabit transceiver for testing. The processing continues by varying a performance aspect of the multi-gigabit transceiver to produce a varied multi-gigabit transceiver. The processing continues by providing an input test signal to the varied multi-gigabit transceiver. The processing further continues by monitoring an output of the varied multi-gigabit transceiver with respect to the input test signal to determine a level of signal integrity. The processing continues by determining when the level of signal integrity provides a desired performance margin. The processing continues by adjusting a programmable operational setting of the multi-gigabit transceiver when the level of signal integrity does not provide the desired performance margin.

28 Claims, 7 Drawing Sheets

OTHER PUBLICATIONS

U.S. Appl. No. 10/659,979, filed Sep. 11, 2003, Kryzak et al.
U.S. Appl. No. 10/659,974, filed Sep. 11, 2003, Kryzak et al.
U.S. Appl. No. 10/660,159, filed Sep. 11, 2003, Groen et al.
U.S. Appl. No. 10/660,016, filed Sep. 11, 2003, Jenkins.
U.S. Appl. No. 10/659,973, filed Sep. 11, 2003, Groen et al.
U.S. Appl. No. 10/660,190, filed Sep. 11, 2003, Groen.
U.S. Appl. No. 10/659,972, filed Sep. 11, 2003, Shafer.
U.S. Appl. No. 10/659,978, filed Sep. 11, 2003, Groen et al.
U.S. Appl. No. 10/660,235, filed Sep. 11, 2003, Boecker et al.
U.S. Appl. No. 10/659, 966, filed Sep. 11, 2003, Chuang et al.
U.S. Appl. No. 10/660,243, filed Sep. 11, 2003, Shafer et al.

* cited by examiner programmable logic device 10 programmable MGT 14 - 28 overall loop back daisy chain coupling 80

MGT to MGT daisy chain coupling 82 programmable receive PMA module 40 programmable transmit
PMA module 38

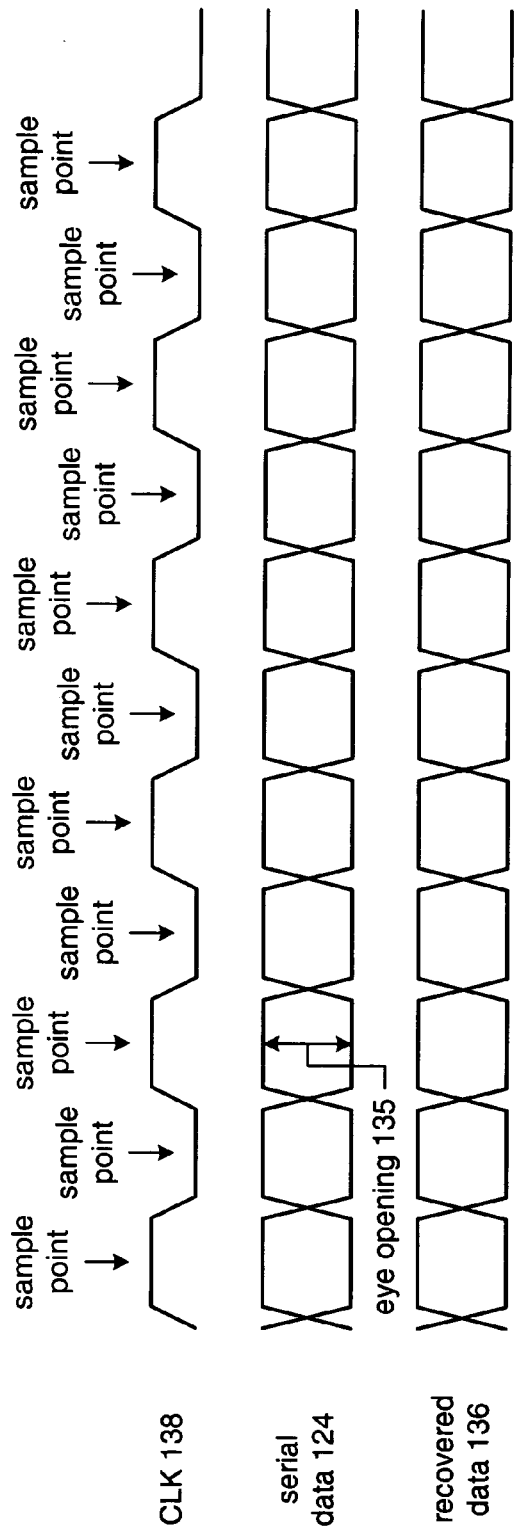
Figure 7: ideal timing diagram of data recovery
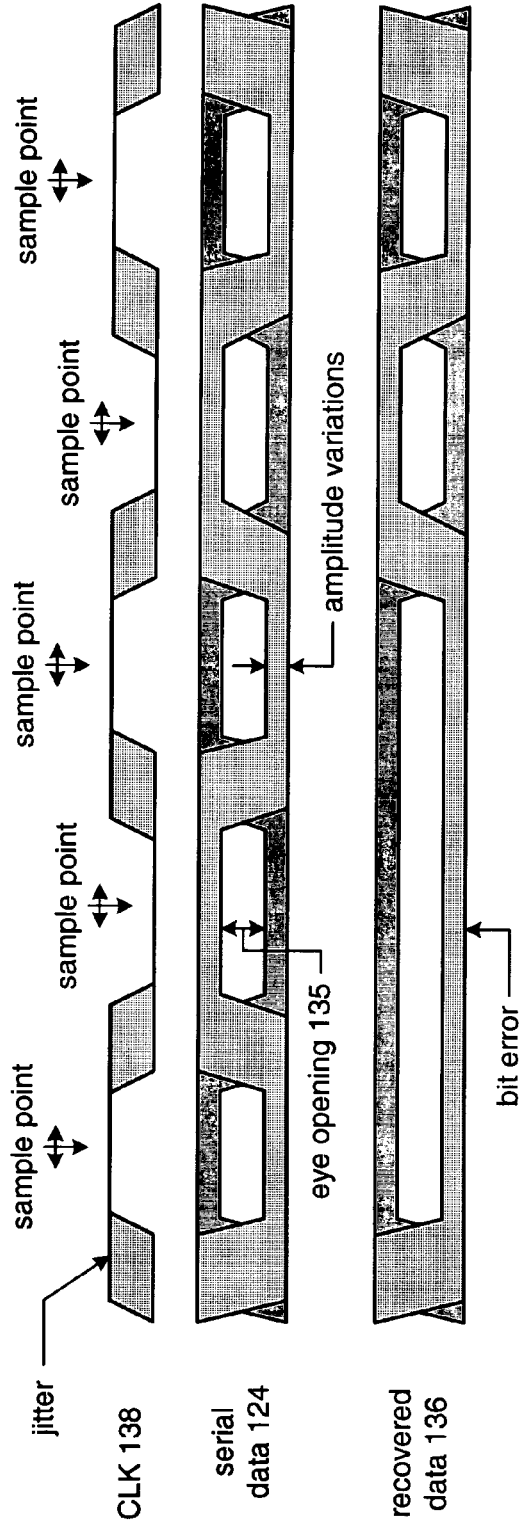
Figure 8: actual and test timing diagram of data recovery

TESTING OF A MULTI-GIGABIT TRANSCEIVER

FIELD OF THE INVENTION

This invention relates generally to general-purpose integrated circuits and more particularly to testing of multi-gigabit transceivers within general-purpose integrated circuits.

DESCRIPTION OF RELATED ART

Programmable devices are a class of general-purpose integrated circuits that can be configured for a wide variety of applications. Such programmable devices have two basic versions, mask programmable devices, which are programmed only by a manufacturer, and field programmable devices, which are programmable by the end-user. In addition, programmable devices can be further categorized as programmable memory devices or programmable logic devices. Programmable memory devices include programmable ready-only memory (PROM), erasable programmable read-only memory (EPROM) and electronically erasable programmable read-only memory (EEPROM). Programmable logic devices include programmable logic array (PLA) devices, programmable array logic (PAL) devices, erasable programmable logic devices (EPLD), and programmable gate arrays (PGA).

Field programmable gate arrays (FPGA) have become very popular for telecommunication applications, Internet applications, switching applications, routing applications, et cetera. Generally, an FPGA includes a programmable logic fabric and a programmable input/output section. The programmable logic fabric may be programmed to perform a wide variety of functions corresponding to the particular end-user applications. The programmable logic fabric may be implemented in a variety of ways. For example, the programmable logic fabric may be implemented in a systematic array configuration, a row base configuration, a sea-of-gates configuration, or a hierarchical programmable logic device configuration.

The programmable input/output section may be fabricated on the perimeter of a substrate supporting the FPGA and provides coupling to the pins of the integrated circuit package allowing users access to the programmable logic fabric. Typically, the programmable input/output section includes a number of serial/deserial transceivers to provide access to the programmable logic fabric. Such transceivers include a receiver section that receives incoming multi-gigabit per second serial data and converts it into parallel data and a transmitter section that converts outgoing parallel data into an outgoing multi-gigabit per second serial data stream.

As with any general-purpose integrated circuit, FPGAs are tested at the die level, i.e., prior to packaging, to verify proper operation and then again after packaging. Such testing involves providing input stimuli to the FPGA and monitoring FPGA outputs. If the outputs provide expected responses to the input stimuli in expected time frames, the FPGA is assumed to be in proper working order. Typically, the input stimuli, the expected responses, and the expected time frames are established based on worst-case process variations of the integrated circuit fabrication technology. By testing to the worst-case process variations, which corresponds to a minimal acceptable performance level, most properly fabricated FPGAS, or any other properly fabricated general-purpose integrated circuit (IC), should pass the testing.

While the worst-case process variation testing provides a good pass/fail benchmark, insuring a minimum acceptable performance level, it does not provide any information as to the degree that the FPGA, or any other IC, passed the testing. Such pass/fail testing is well suited for ICs that include circuits with fixed performance attributes. However, for ICs that include circuits with programmable performance attributes (e.g., a transceiver of an FPGA includes a programmable receiver front-end and a programmable transmit driver), the pass/fail testing does not indicate whether the programmable attributes are optimally set, just that they are set above the minimal acceptable performance level. Accordingly, without the ability to optimize the settings of the programmable attributes, the overall operation of the IC, including FPGAs, is not optimized except by chance.

Therefore, a need exists for comprehensive testing of integrated circuits such that programmable attributes therein may be optimally set.

BRIEF SUMMARY OF THE INVENTION

The testing of a multi-gigabit transceiver of the present invention substantially meets these needs and others. In one embodiment, a method for testing a multi-gigabit transceiver begins by configuring the multi-gigabit transceiver for testing. The processing continues by varying a performance aspect of the multi-gigabit transceiver to produce a varied multi-gigabit transceiver. The processing continues by providing an input test signal to the varied multi-gigabit transceiver. The processing further continues by monitoring an output of the varied multi-gigabit transceiver with respect to the input test signal to determine a level of signal integrity (e.g., bit error rate, eye opening, etc.). The processing continues by determining when the level of signal integrity provides a desired performance margin. The processing continues by adjusting a programmable operational setting of the multi-gigabit transceiver when the level of signal integrity does not provide the desired performance margin. Accordingly, the programmable operation settings of the multi-gigabit transceiver may be optimally set.

An embodiment of a multi-gigabit transceiver includes a transmit physical media attachment module, a receive physical media attachment module, a transmit physical coding sublayer module, a receive physical coding sublayer, and a control module. The transmit physical media attachment module is operably coupled to convert parallel input data into serial output data. The receive physical media attachment module is operably coupled to convert receive serial data into receive parallel data. The transmit physical coding sublayer module is operably coupled to convert transmit data words into the parallel input data. The receive physical coding sublayer module operably coupled to convert the receive parallel data into receive data words. The control module is operably coupled to place the multi-gigabit transceiver in a test mode or an operation mode, wherein, when in the test mode, the control module facilitates testing of the multi-gigabit transceiver by: configuring the multi-gigabit transceiver for testing; varying a performance aspect of the multi-gigabit transceiver to produce a varied multi-gigabit transceiver; providing an input test signal to the varied multi-gigabit transceiver; monitoring an output of the varied multi-gigabit transceiver with respect to the input test signal to determine a level of signal integrity; determining when the level of signal integrity provides a desired performance margin; and, when the level of signal integrity does not provide the desired performance margin, adjusting a programmable operational setting of the multi-gigabit transceiver.

BRIEF DESCRIPTION OF THE SEVERAL VIEWS OF THE DRAWINGS

FIG. 7 is an ideal timing diagram of data recovery within the receive physical media attachment module in accordance with the present invention; and FIG. 8 is an actual timing diagram of data recovery within the receive physical media attachment module in accordance with the present invention.

DETAILED DESCRIPTION OF THE INVENTION

Figure 1:
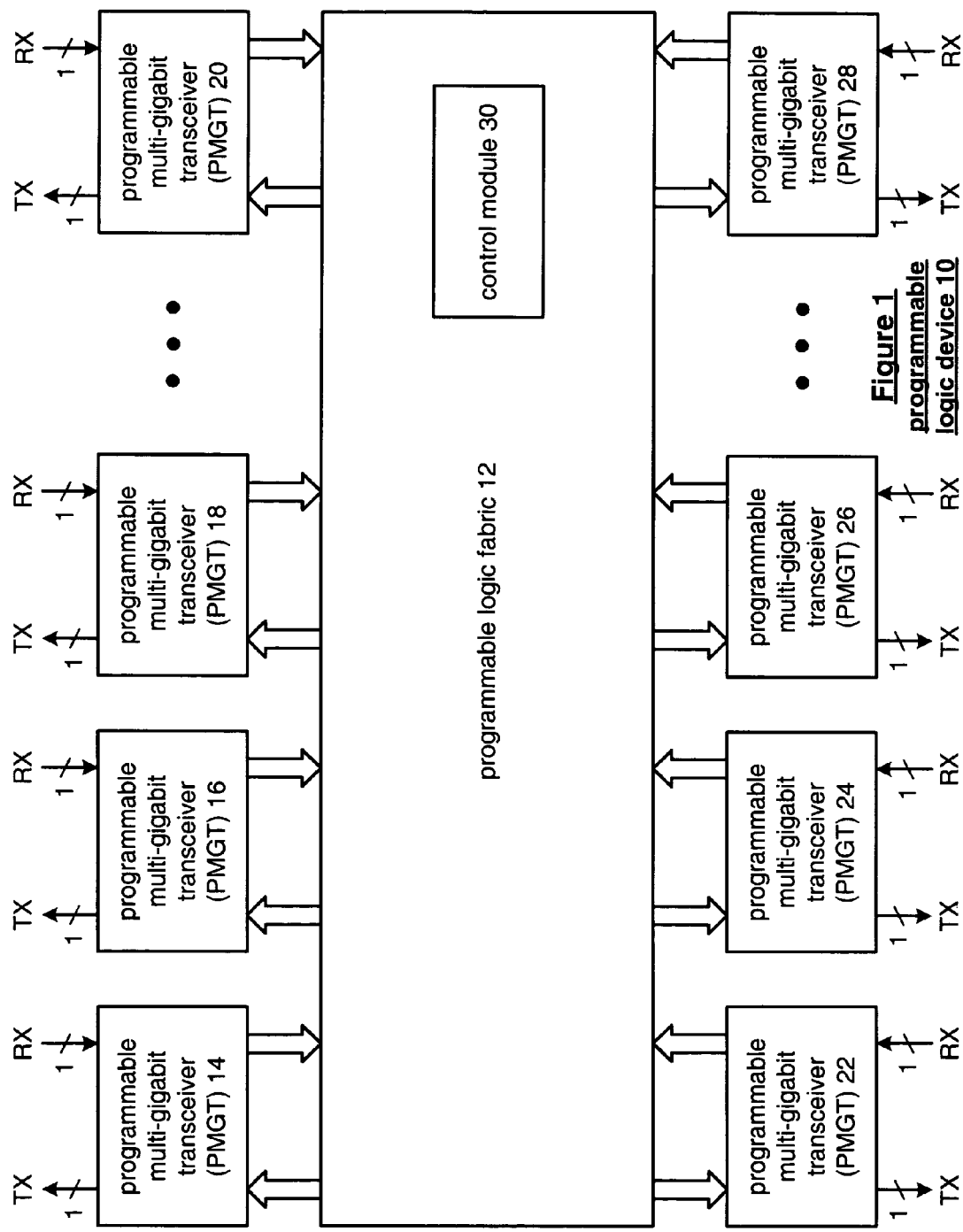
FIG. 1 is a schematic block diagram of a programmable logic device in accordance with the present invention.

FIG. 1 is a schematic block diagram of a programmable logic device 10 that includes programmable logic fabric 12, a plurality of programmable multi-gigabit transceivers (PMGT) 14–28 and a control module 30. The programmable logic device 10 may be a programmable logic array device, a programmable array logic device, an erasable programmable logic device, and/or a field programmable gate array (FPGA). When the programmable logic device 10 is a field programmable gate array (FPGA), the programmable logic fabric 12 may be implemented as a symmetric array configuration, a row-based configuration, a sea-of-gates configuration, and/or a hierarchical programmable logic device configuration. The programmable logic fabric 12 may further include at least one dedicated fixed processor, such as a microprocessor core, to further facilitate the programmable flexibility offered by a programmable logic device 10.

The control module 30 may be contained within the programmable logic fabric 12 or it may be a separate module. In either implementation, the control module 30 generates the control signals to program each of the transmit and receive sections of the programmable multi-gigabit transceivers 14–28 and facilitates testing of the MGTs 14–28. In general, each of the programmable multi-gigabit transceivers 14–28 performs a serial-to-parallel conversion on received data and performs a parallel-to-serial conversion on transmit data. The parallel data may be 8-bits, 16-bits, 32-bits, 64-bits, et cetera wide. Typically, the serial data will be a 1-bit stream of data that may be a binary level signal, multi-level signal, etc. Further, two or more programmable multi-gigabit transceivers may be bonded together to provide greater transmitting speeds. For example, if multi-gigabit transceivers 14, 16 and 18 are transceiving data at 3.125 gigabits-per-second, the transceivers 14–18 may be bonded together such that the effective serial rate is 3 times 3.125 gigabits-per-second.

Each of the programmable multi-gigabit transceivers 14–28 may be individually programmed to conform to separate standards. In addition, the transmit path and receive path of each multi-gigabit transceiver 14–28 may be separately programmed such that the transmit path of a transceiver is supporting one standard while the receive path of the same transceiver is supporting a different standard. Further, the serial rates of the transmit path and receive path may be programmed from 1 gigabit-per-second to tens of gigabits-per-second. The size of the parallel data in the transmit and receive sections, or paths, is also programmable and may vary from 8-bits, 16-bits, 32-bits, 64-bits, et cetera.

Figure 2:
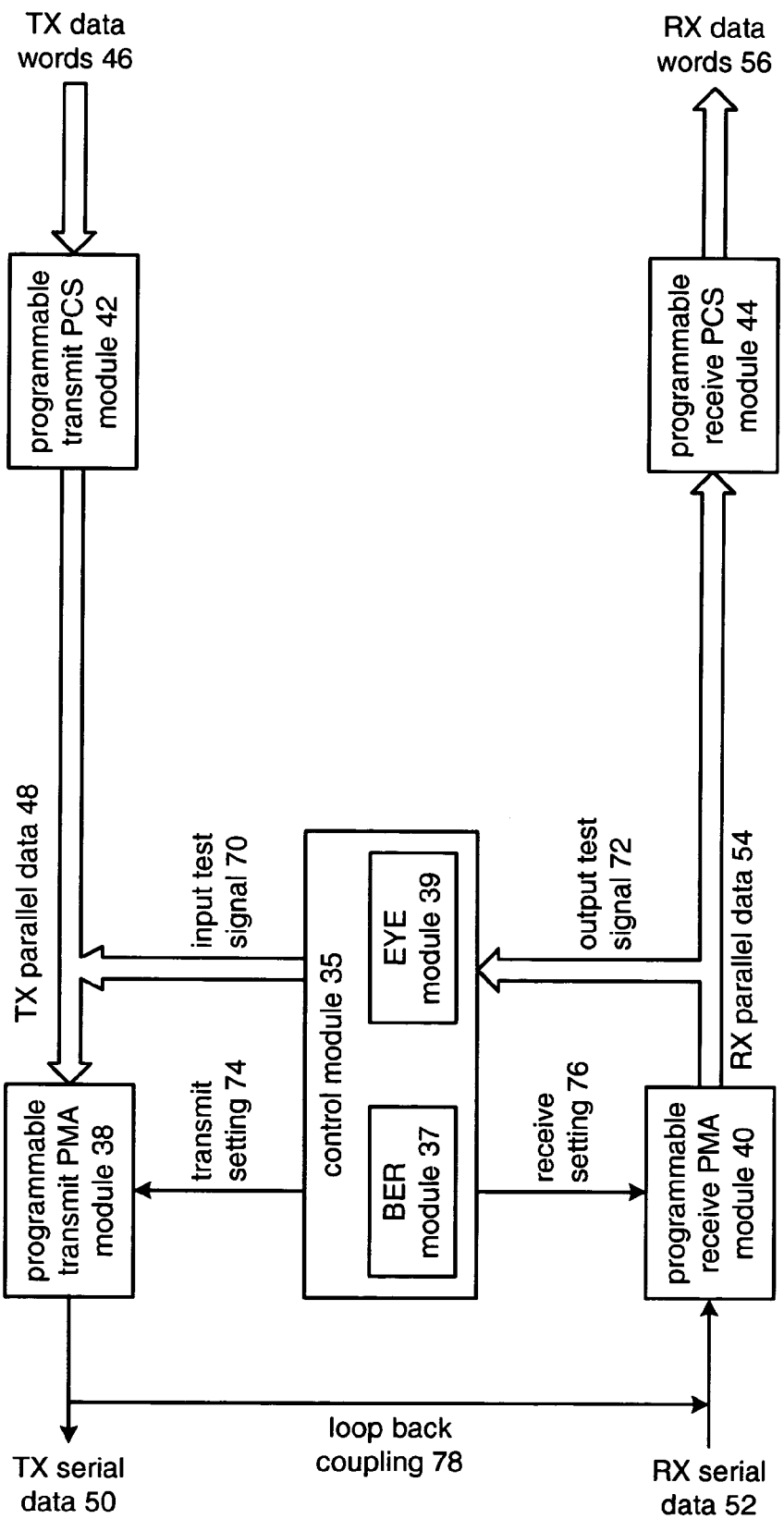
FIG. 2 is a schematic block diagram of a programmable multi-gigabit transceiver in accordance with the present invention.

FIG. 2 illustrates a schematic block diagram of a representative MGT of the programmable MGTs 14–28. The MGT includes a programmable transmit physical media attachment (PMA) module 38, a programmable receive PMA module 40, a programmable transmit physical coding sublayer (PCS) module 42, a programmable receive PCS module 44, and a control module 35. The control module 35 includes a bit error rate (BER) module 37 and/or an EYE module 39. AS one of average skill in the art will appreciate, the control module 35 may be a separate device from control module 30 or included within control module 30. In either implementation, control module 35 works in conjunction with control module 30 to facilitate testing and normal operation of the each of the MGTs 14–28.

In a normal operating mode, the programmable PCS module 42 converts transmit data words 46 that it receives from the programmable logic fabric 12 into transmit parallel data 48. The transmit data words 46 may be 2, 4, 6, 8, etc. bytes in width and the transmit parallel data 48 may be 16 bits, 32 bits, 64 bits, etc. as prescribed by the standard, or standards, being supported by the MGT.

The programmable transmit PMA module 38, which will be described in greater detail with reference to FIG. 6, converts the transmit parallel data 48 into transmit serial data 50 based on the transmit settings 74 and in accordance with the standard or standards supported by the MGT. The transmit settings 74 may include, but are not limited to, a parallel to serial setting, test/normal mode setting, pre-emphasis setting, slew rate setting, and drive level setting.

The programmable receive PMA module 40, which will be described in greater detail with reference to FIG. 5, converts receive serial data 52 into receive parallel data 54 based on receive settings 76 and in accordance with the standard or standards supported by the MGT. The receive parallel data 54 may be 16 bits, 32 bits, 64 bits, etc. in width as prescribed by the standard, or standards. The receive settings 76 may include, but are not limited to, a receive termination setting, an equalization setting, an amplification setting, test/normal mode setting, and a serial to parallel setting.

The programmable PCS module 44 converts the receive parallel data 54 into receive data words 56 that are provided to the programmable fabric 12. The receive data words 56 may be 2, 4, 6, 8, etc. bytes in width as prescribed by the standard, or standards, being supported by the MGT.

Figure 3:
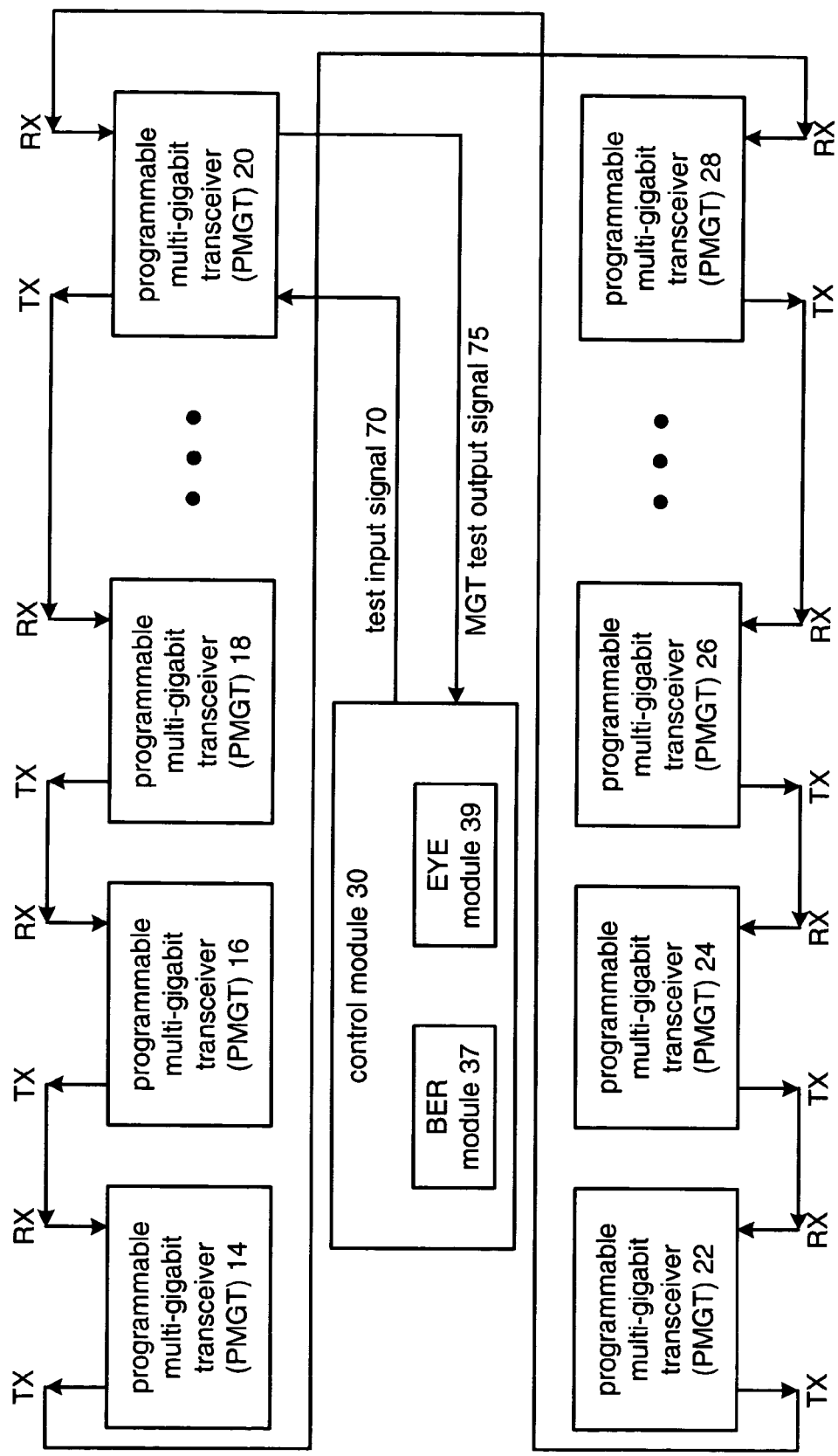
FIG. 3 is a schematic block diagram of the multi-gigabit transceivers of the programmable logic device configured for testing in accordance with the present invention.

In a test mode of the programmable MGT, the control module 35 configures the multi-gigabit transceiver for testing. This may be done by enabling on-chip or off-chip loop back coupling 78 of the transmit PMA module 38 output to the receive PMA module 40 input. Alternatively, the configuration for testing may be done as illustrated in FIG. 3 or in FIG. 4, which will be described in detail below. With the MGT configured for testing, the control module 35 provides an input test signal 70 to the parallel input of the programmable transmit PMA module 38. The input test signals 70 may be a known test pattern or a pseudo random test pattern. In addition, the control module 35 provides the transmit settings 74 to the programmable transmit PMA module 38. The transmit settings 74 may be initial set at nominal levels, minimum levels, or maximum levels.

The programmable transmit PMA module 38 converts the input test signal 70 into transmit serial data 50, which is coupled to the serial input of the programmable receive PMA module 40. The programmable receive PMA module 40, in accordance with the receive settings 76, converts the received serial test signals into a parallel output test signal 72. The control module 35 determines the bit error rate, via the BER module 37, of the output test signal 72 and may further determine the eye opening, via the EYE module 39, of the output test signal 72 to establish a performance characteristic benchmark. Note that the bit error rate and eye opening analysis will be described in greater detail with reference to FIGS. 7 and 8, but in general, the bit error rate is a measure of the accuracy of recovering transmitting data (e.g., 1 bit in error for every $10^{12}$ to $10^{14}$ bits received is a typical bit error rate) and the eye opening is an indication of the voltage difference between a logic 1 and a logic 0 within a bit period and jitter tolerance (e.g., how closed could the eye be from left to right).

Having established benchmark measurements, the control module degrades a performance aspect of the multi-gigabit transceiver to produce a varied multi-gigabit transceiver. This may be done, for example, by changing the transmit settings 74 and/or the receive settings 76 to: add jitter to a clock signal of the transmit and/or the receive PMA module; change an output slew rate of the transmit PMA module; change amplitude of the output of the transmit PMA module; adjust equalizer coefficients of an equalizer within the receive PMA module; add power supply noise to a supply voltage source of the transmit PMA module or the receive PMA module; add noise to the input test signal; provide adjacent channel noise on a channel proximal to the coupling of the transmit PMA module to the receive PMA module; and/or provide load noise, via the programmable fabric, on an output of the receive PMA module.

With at least one performance aspect of the MGT varied, the control module again provides the input test signal 70 to the programmable transmit PMA module 38. The programmable transmit PMA module 38 converts the input test signal 70 into transmit serial test data 50 that is coupled to the input of the programmable receive PMA module 40. The programmable receive PMA module 40 converts the transmit serial test data 50 into the output test signal 72. The control module 35 monitors the output test signal 72 with respect to the input test signal 70 to determine a level of signal integrity via the BER module 37 and/or the EYE module 39.

The control module 35 then determines whether the level of signal integrity provides a desired performance margin. For example, if the initial receive and transmit settings 74 and 76 were set at nominal levels (i.e., the designed optimal settings), an adjustment to the receive or transmit settings should degrade the quality of data recovery with the programmable receive PMA module 38. As such, with the performance of the MGT degraded, the determination of the signal integrity is determining whether the MGT still performs at, or above, a minimum acceptable performance level (e.g., a minimum bit error rate and/or a minimum eye opening). If so, the signal integrity provides the desired performance margin. If not, there is insufficient performance margin. Alternatively, if the initial receive settings were set at a minimum or a maximum level, the receive settings may be swept from one end of the spectrum to the other as the transmit settings 74 are adjusted to determine the receive settings 74 providing the best bit error rate and eye opening.

When the level of signal integrity does not provide the desired performance margin, the control module 35 adjusts a programmable operational setting of the multi-gigabit transceiver (e.g., the receive settings 76, which includes, but is not limited to, equalization settings, amplification settings, and/or adjusting the sampling point). With the operational setting adjusted, the testing is repeated to determine whether the MGT now provides the desired performance margin. If the MGT still does not provide the desired performance margin, it may be deemed to have failed testing and discarded or labeled as a reduced operational part (e.g., lower data rates, higher signal to noise ratio requirements, etc.).

FIG. 3 is a schematic block diagram of the plurality of MGTs 14–28 operably coupled in an overall loop back daisy chain for testing the MGTs. In this embodiment, the control module 30 includes the bit error rate module 37 and/or the EYE module 39 and provides the test input signal 70, as transmit test data words, to the transmit PCS module of a first MGT 20 of the plurality of MGTs. The transmit PCS module of MGT 20 converts the transmit test data words into parallel test data, which is converted into transmit serial test data by the transmit PMA module of MGT 20. Alternatively, the control module 30 may provide the test input signal 70, as transmit parallel test data, to the transmit PMA module of MGT 20, which converts the transmit parallel test data into the transmit serial test data.

In accordance with the daisy chain configuration, the transmit serial test data produced by MGT 20 is provided to the receive PMA module of MGT 18. The receive PMA module of MGT 18 converts the received serial test data into parallel test data. The control module 35 provides an internal loop back connection to couple the recovered parallel test data, as produced by its receive PMA module, to its transmit PMA module. The transmit PMA module of MGT 18 converts the recovered parallel test data into serial test data that is provided to the receive PMA module of MGT 16. In this manner, the test signal propagates through each of the MGTs until the receive PMA module of MGT 20 converts the received serial test data into the MGT test output signal 75.

The control module 30 analyzes the MGT test output signal 75 for a desired level of signal integrity (e.g., an acceptable bit error rate and/or an acceptable eye opening). As described with reference to FIG. 2, the control module 30 may vary a performance aspect of one or more of the MGTs to facilitate the testing. In addition, each of the control modules 35 within the respective MGTs 14–28 may analyze the parallel test data, as the output test signal 72, to determine the level of signal integrity for its receive PMA module.

Figure 4:
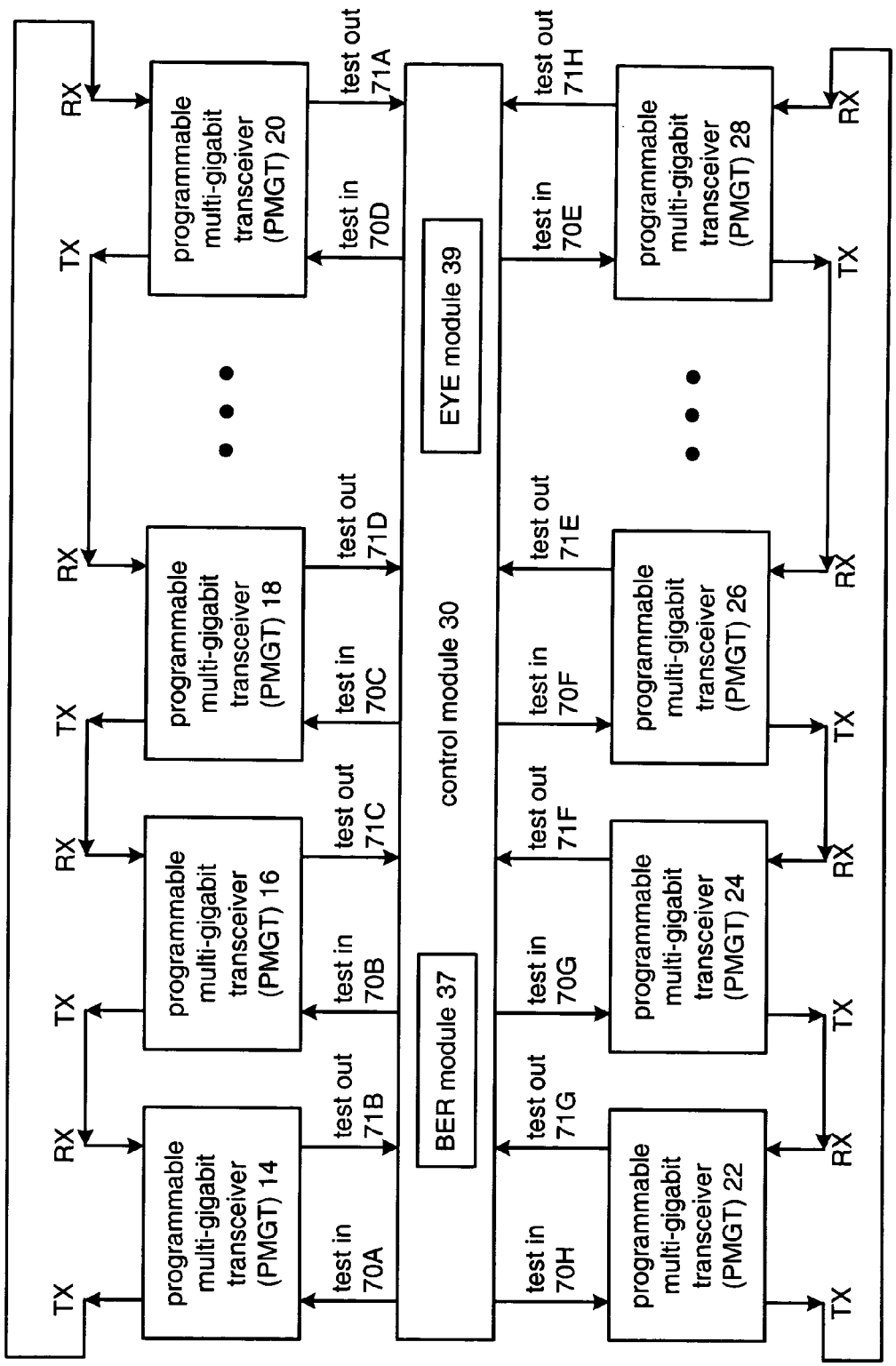
FIG. 4 is an alternate schematic block diagram of the multi-gigabit transceivers of the programmable logic device configured for testing in accordance with the present invention.

FIG. 4 is a schematic block diagram of an alternate method for configuring the MGTs for testing. In this embodiment, the MGTs 14–28 are coupled in an MGT to MGT daisy chain manner. As shown, the control module 30 provides an input test signal 70A, 70B, 70C, 70D, 70E, 70F, 70G, and 70H to the transmit PCS module or transmit PMA module of each of the MGTs 14–28. The transmit PMA module of each of the MGTs 14–28 convert the test input signal into serial test data. The serial test data produced by one MGT is provided to the receive PMA module of another MGT. For example, the serial test data produced by MGT 14 is provided to the receive PMA module of MGT 20.

Each receive PMA module of the MGTs 14–28 converts the received serial test data into parallel test data 71A, 71B, 71C, 71D, 71E, 71F, 71G, and 71H that is provided to the control module 30. The control module 30 analyzes the parallel test data 71A, 71B, 71C, 71D, 71E, 71F, 71G, and 71H for a desired level of signal integrity (e.g., an acceptable bit error rate and/or an acceptable eye opening). As described with reference to FIG. 2, the control module 30 may vary a performance aspect of one or more of the MGTs to facilitate the testing. In addition, each of the control modules 35 within the respective MGTs 14–28 may analyze the parallel test data, as the output test signal 72, to determine the level of signal integrity for its receive PMA module.

As one of average skill in the art will appreciate, there are numerous ways in which the MGTs may be coupled to test the signal integrity and to determine whether a desired performance margin is achieved. For instance, one MGT of one IC may be remotely coupled to an MGT on another IC in a loop back mode such that both MGTs may be tested in accordance with the teachings of the present invention. As one of average skill in the art will further appreciate, the determination of the signal integrity (e.g., bit error rate and/or eye opening) and the interpretation to determine whether a desired level of performance margin is obtained may be done solely by off-chip automated test equipment (ATE), in conjunction with control module 30, and/or in conjunction with control module 30 and control modules 35.

Figure 5:
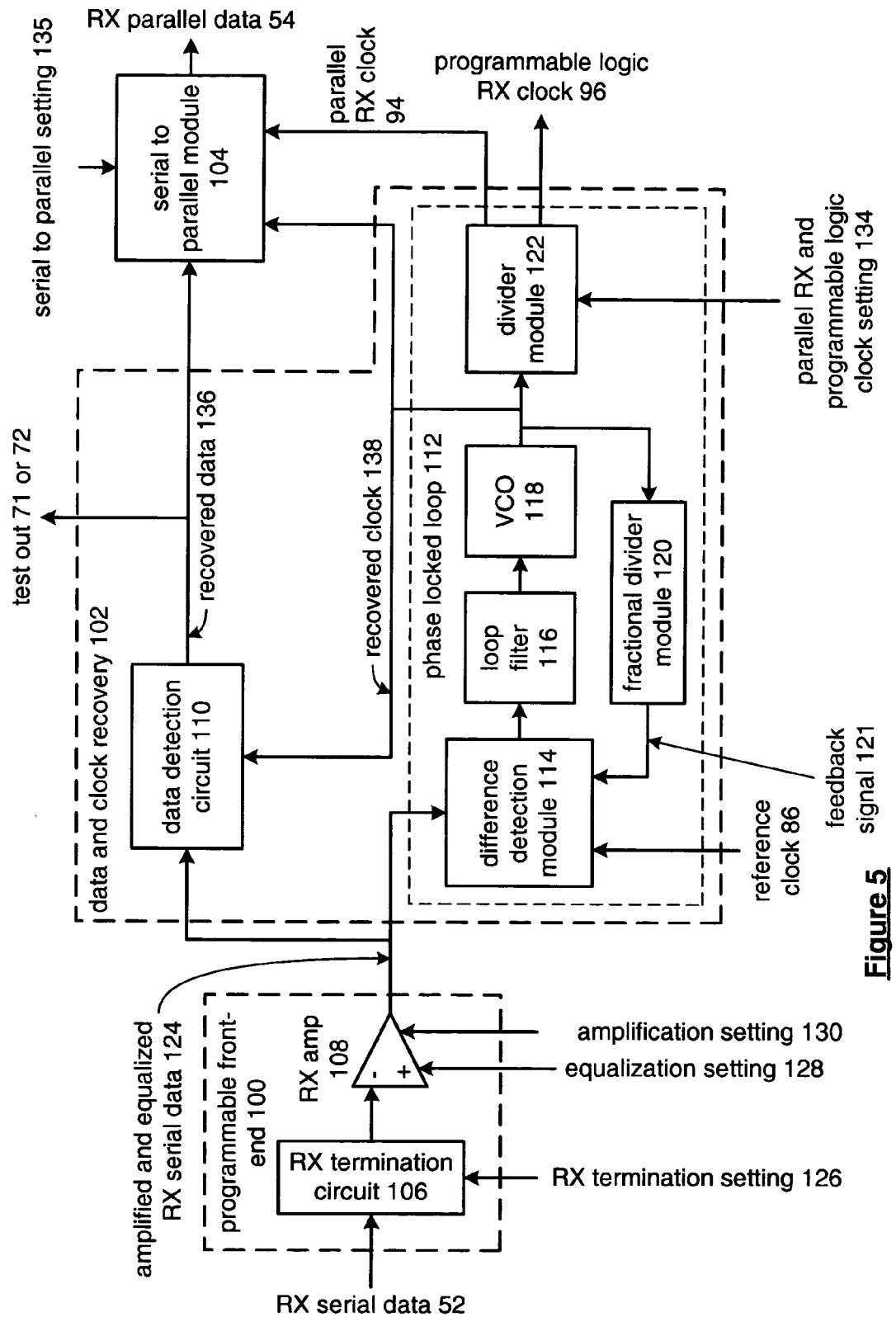
FIG. 5 is a schematic block diagram of a programmable receive physical media attachment module in accordance with the present invention.

FIG. 5 is a schematic block diagram of the programmable receive PMA module 40 that includes a programmable front-end 100, a data and clock recovery module 102, and a serial to parallel module 104. The programmable front-end 100 includes a receive termination circuit 106 and a receive (RX) amplifier 108. The data and clock recovery module 102 includes a data detection circuit 110 and a phase locked loop 112. The phase locked loop 112 includes a difference detection module 114, a loop filter 116, a voltage controlled oscillator (VCO) 118, a fractional divider module 120, and an output divider module 122.

In normal operation, the receive termination module 106 AC couples the receive serial data 52, at a desired impedance level, to the RX amplifier 108. An inputted RX termination setting signal 126 establishes the desired impedance level. The RX amplifier 108 equalizes and amplifies the receive serial data 52 in accordance with an equalization setting 128 and an amplification setting 130 to produce an amplified and equalized RX serial data 124.

The phase locked loop 112 and the data detection circuit 110 receive the amplified and equalized RX serial data 124. The phase locked loop 112 produces a recovered clock 138 from the serial data 124. The data detection circuit 110 samples the RX serial data 124 at the rate of the recovered clock 138 to produce recovered data 136. The recovered data 136 is then converted into RX parallel data 54 by the serial to parallel module 104 based on the serial to parallel setting 135, which indicates the desired rate and width of the resulting parallel data 54, the recovered clock 138, and a parallel RX clock 94.

To produce the recovered clock 138, the phase locked loop 112, prior to receiving the RX serial data 124, locks to a reference clock 86, which has a rate substantially equal to the rate of the RX serial data 124. When the RX serial data is received, the phase locked loop 112 switches to lock to the RX serial data 124. In general, the difference detection module 114 functions as a phase and frequency detector during coarse loop mode (i.e., when the PLL is locking to the reference clock 86) and functions as a phase detector during fine loop mode (i.e., when the PLL is locking to the serial data 124). In the fine loop mode, the difference detection module 114 generates a positive current when the phase of the RX serial data 124 leads the phase of a feedback signal 121, which represents that the recovered clock 138 is too late. The difference detection module 114 generates a negative current when the phase of the RX serial data 124 lags the phase of a feedback signal 121, which represents that the recovered clock 138 is too early. The difference detection module 114 also generates a zero current when the phases of the RX serial data 124 and the feedback signal 121 are substantially equal, which represents that the recovered clock is at the desired rate.

The loop filter 116, which includes at least a capacitor, converts the positive current, negative current, and zero current into a control voltage, which is provided to the VCO 118. Accordingly, the oscillation rate of the VCO 118 (i.e., the rate of the recovered clock 138) increases as the control voltage increases, which occurs when the positive current is present. Conversely, the oscillation rate of the VCO 118 decreases as the control voltage decreases, which occurs when the negative current is present. The oscillation rate of the VCO 118 remains relatively constant when the zero current is present.

The fractional divider module 120 divides the recovered clock 138 by an integer divider value during fine loop mode to produce the feedback signal 121. The divider module 122 divides the recovered clock 138 based on a parallel RX and programmable clock setting 134 to produce a parallel RX clock 94. Note that the divider module 122 may use a fractional divider value to achieve the desired rate of the feedback signal 121 when the PLL is in a coarse loop mode.

In the test mode, the equalization setting 128, the amplification setting 130, and/or the value of the fractional divider module 120 may be varied to accommodate the testing. For example, the equalization setting 128 provides equalizer coefficients such that the equalizer portion of the RX amplifier 108 has a frequency and phase response to compensate for the frequency and phase response of a channel on which the RX serial data 52 is received. In test mode, however, the equalization setting 128 may set to add an adverse channel response to test the receive PMA module 40 sensitivity (i.e., the ability of the receive PMA module 40 to accurately to produce the recovered data 136 given the current environmental conditions). Alternatively, or in addition, the amplification setting 130 may be set to reduce the gain of the RX amplifier to further test the receive PMA module 40 sensitivity.

Still further, the fractional divider module 120 may be set to produce a divider value that includes a fractional portion. To achieve the fractional portion, the fractional divider module 120 oscillates between dividing the recovered clock 138 by the base integer value and dividing the recovered clock 138 by the base integer value plus one. For example, if the desired divider value is 10.5, the fractional divider module 120, during one cycle, divides the recovered clock 138 by the base integer value 10 and on the next cycle divides the recovered clock 138 by 11. By continually alternating between divide by 10 and divide by 11, the effective divider value is 10.5. The toggling of the divider value in this manner adds jitter to the recovered clock 138. Thus, jitter can be induced into the recovered clock 138 to test the receive PMA module 40 in the presence of jitter. Typically, the fractional portion is most effective for adding jitter when the PLL is in coarse loop mode, and may be less effective during fine loop operation. However, when the PLL is locking to incoming serial data, jitter may be added by using a fractional portion in the fractional divider module on the transmit end, as will be described below in connection with FIG. 6.

Even further, the sampling point used by the data detection module 110 may be adjusted to test the receive PMA module sensitivity. In practice, it is desired to have the sampling point occurring at a time equally distant from transitions of the recovered data 136. If the sampling point is shifted from center, a data transition may not reach a desired level before it is sampled, thus producing a bit error. As such, adjusting the sampling point tests the sensitivity of the receive PMA module 40.

As will be described with reference to FIG. 6, several performance aspects of the transmit PMA module 38 may be varied during testing to degrade, and/or alter, the signal quality of the RX serial data 52 received by the receive PMA module 40. Accordingly, by varying performance aspects of the transmit and/or receive PMA modules 38 and 40, the sensitivity of the receive PMA module 40 may be determined under various simulated environmental conditions and the programmable operational settings (e.g., the equalization setting 128, the amplification setting 130, and the sampling point) may be adjusted to provide optimal performance (i.e., provide a desired performance margin with respect to a bit error rate and/or eye opening).

Figure 6:
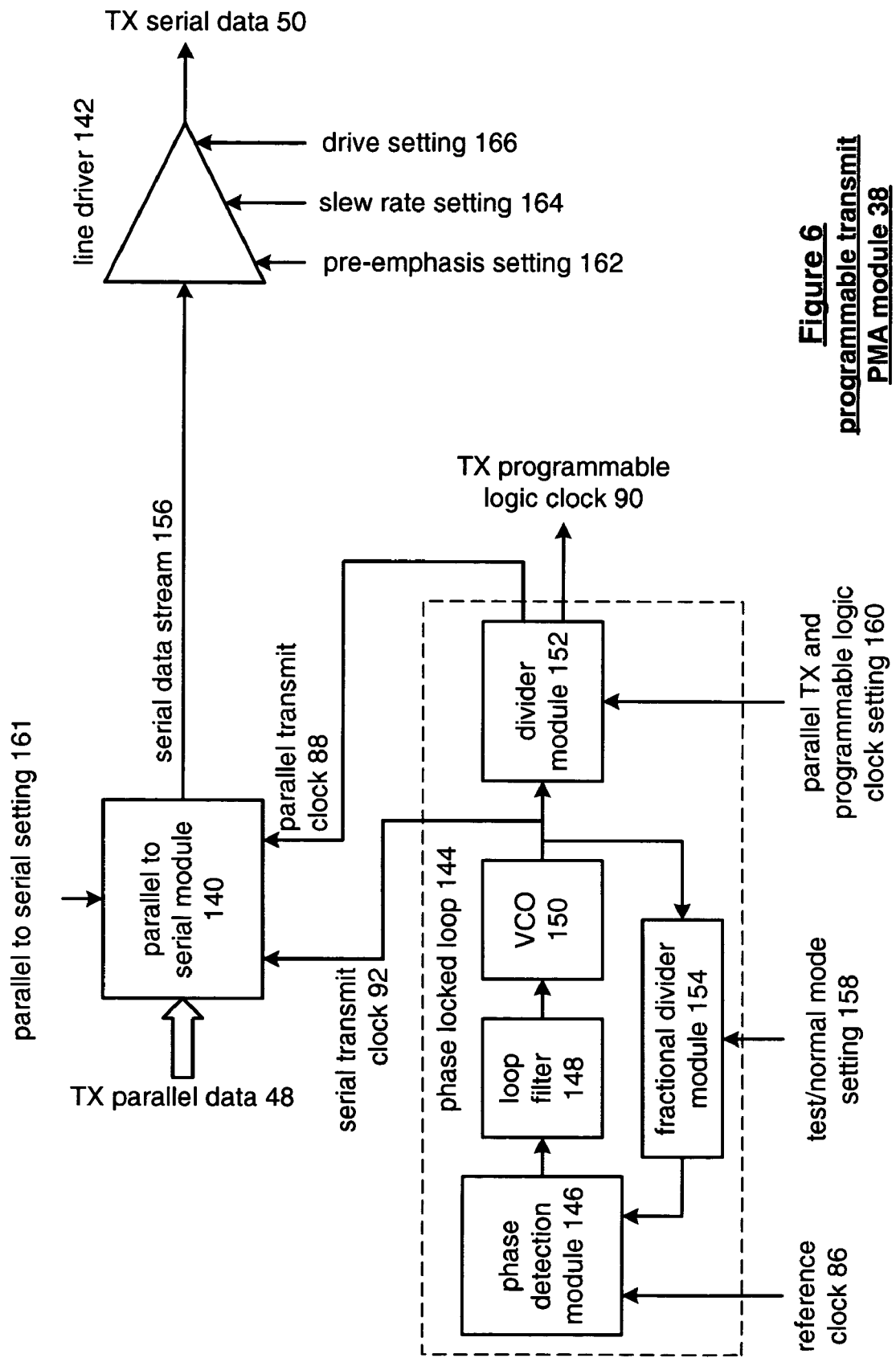
FIG. 6 is a schematic block diagram of a programmable transmit physical media attachment module in accordance with the present invention.

FIG. 6 is a schematic block diagram of the programmable transmit PMA module 38 that includes a phase locked loop 144, a parallel to serial module 140, and a line driver 142. The phase locked loop 144 includes a phase and frequency detector 146, a loop filter 148, a VCO 150, a fractional divider module 154, and a divider module 152 to produce a serial transmit clock 92 from a reference clock 86 and to produce a parallel transmit clock 88 from the serial transmit clock 92 and a parallel TX and programmable logic clock setting 160. The parallel to serial module 140 is operably coupled to convert the TX parallel data 48 into a serial stream of data 156 in accordance with a parallel to serial setting 161, the serial transmit clock 92, and the parallel transmit clock 88. The line driver 142 drives the serial stream of data 156 in accordance with a pre-emphasis setting 162, a slew rate setting 164, and a drive setting 166 to produce the TX serial data 50.

In test mode, the test/normal mode setting 158 is set to test, which causes the fractional divider module 154 to use a divider value that includes a fractional portion. As described above with reference to the PLL 112 of FIG. 5, by using a fractional divider value, jitter is introduced in the clock. In this instance, jitter is introduced into the serial transmit clock 92. As such, a noisy input test signal can be generated and provided to the receive PMA module of the MGTs to test its sensitivity. Further, the TX serial data 50 may be altered by varying the pre-emphasis setting 162, the slew rate setting 164, and/or the drive setting 166.

FIG. 7 is an ideal timing diagram of the data recovery within the receive PMA module 40 of an MGT 14–28. As shown, the recovered clock 138 has a fifty percent duty cycle, where the data sampling points are centered between the transitions of the recovered clock 138. In this ideal illustration, the clock edges are clean (i.e., no jitter) and the rise and fall times are fast and equal. The RX serial data 124 is time aligned with the clock and is either a logic one or a logic zero at each clock cycle. As is further illustrated, the magnitude difference of a logic one and a logic zero of the serial data 124 provides the eye opening 135. The greater the eye opening 135, the easier it is to determine whether the current bit is a one or a zero. The recovered data 136 is the result of sampling the serial data 124 at the sampling points. In this ideal illustration, the recovered data 136 exactly matches the serial data 124 (i.e., no bit errors).

FIG. 8 is an actual and test timing diagram of the data recovery with the receive PMA module 40 of an MGT 14–28. In this illustration, the recovered clock 138 includes jitter such that the duty cycle of the clock 138 varies from cycle to cycle and over time. As is known, if the duty cycle of clock varies from the desired 50 percent, the processing time for double edge data processing is reduced based on the shorter cycle. For example, if the duty cycle varies to a 40 to 60 percent duty cycle and the clock rate is 1 GHz, the available processing cycle time is 0.4 nanosecond (ns) (i.e., 0.40*1 ns). Thus, during test, by adding a known amount of jitter either in the recovered clock 138 or in the serial transmit clock 92, via the fractional divider module, a processing time margin can be ascertained. For example, if a 20 percent jitter were added, the clock duty cycle would vary to a 40 to 60 percent duty cycle. If the resulting recovered data has at least a desired bit error rate, then it is known that this particular MGT has a processing time margin that can withstand at least a 20 percent jitter.

To further test the performance margin, the slew rate (i.e., the rise and fall times) of the TX serial data may be adjusted, which changes the slew rate of the RX serial data 124. As the slew rate decreases, the RX serial data 124 takes longer to reach the logic one state or the logic zero state. As such, the RX serial data 124 may be at an indeterminate state (i.e., not sufficiently high enough to be a logic one or sufficiently low enough to be a logic zero) when the sampling point occurs, which causes a bit error.

Still further, the sampling point may be varied from the center to test the receive PMA module sensitivity. Yet further, the amplitude of the serial data 124 may be adjusted by changing the settings of the line driver 142 and/or the settings of the RX amplifier 108. As the amplitude of the RX serial data 124 is decreased, the eye opening 135 is decreased. If the eye opening is not of a minimal size, as inferred by the specified logic one and logic zero levels, the data recovery module cannot ascertain whether a current bit is a one or a zero, which results in a bit error.

The preceding discussion has presented a method for testing a multi-gigabit transceiver to ascertain a performance margin. If the performance margin is not of a desired level, a programmable operational setting of the multi-gigabit transceiver may be adjusted or the multi-gigabit transceiver may be rejected. As one of average skill in the art will appreciate, other embodiments may be derived from the teachings of the present invention without deviating from the scope of the claims.

What is claimed is:

1. A method for testing a multi-gigabit transceiver, the method comprises:
   configuring the multi-gigabit transceiver for testing;
   varying a performance aspect of the multi-gigabit transceiver to produce a varied multi-gigabit transceiver;
   providing an input test signal to the varied multi-gigabit transceiver;
   monitoring an output of the varied multi-gigabit transceiver with respect to the input test signal to determine a level of signal integrity;
   determining whether the level of signal integrity provides a desired performance margin; and
   when the level of signal integrity does not provide the desired performance margin, adjusting a programmable operational setting of the multi-gigabit transceiver.

2. The method of claim 1, wherein the configuring the multi-gigabit transceiver further comprises:
    configuring a transmit physical media attachment module of the multi-gigabit transceiver or of another multi-gigabit transceiver to transmit the input test signal as a serial data stream; and
    coupling an output of the transmit physical media attachment module to an input of a receive physical media attachment module of the multi-gigabit transceiver.

3. The method of claim 2, wherein the varying a performance aspect of the multi-gigabit transceiver further comprises at least one of:
    adding jitter to a clock signal of the receive physical media attachment module or of the transmit physical media attachment module;
    changing an output slew rate of the transmit physical media attachment module;
    changing an amplitude of the output of the transmit physical media attachment module;
    adjusting equalizer coefficients of an equalizer within the receive physical media attachment module;
    adding power supply noise to a supply voltage source the transmit physical media attachment module or the receive physical media attachment module;
    adding noise to the input test signal;
    providing adjacent channel noise on a channel proximal to the coupling of the transmit physical media attachment module to the receive physical media attachment module; and
    providing load noise on an output of the receive physical media attachment module.

4. The method of claim 3, wherein the adding the jitter to the clock signal further comprises:
    adjusting a fractional divider of a phase locked loop during test mode; and
    setting the fractional divider to an integer value during normal mode.

5. The method of claim 1, wherein the adjusting the programmable operational setting of the multi-gigabit transceiver further comprises at least one of:
    adjusting equalization settings of an equalizer within a receive physical media attachment module of the multi-gigabit transceiver;
    adjusting amplification settings of an amplifier within the receive physical media attachment module; and
    adjusting a sampling point within a data detection circuit within the receive physical media attachment module.

6. The method of claim 1 further comprises:
    when the level of signal integrity provides the desired performance margin, maintaining the programmable operational setting of the multi-gigabit transceiver.

7. The method of claim 1, wherein the monitoring the output of the varied multi-gigabit transceiver further comprises at least one of:
    monitoring bit error rate of a receive physical media attachment module of the multi-gigabit transceiver; and
    determining an eye opening of a recovered signal as produced by the receive physical media attachment module of the multi-gigabit transceiver.

8. The method of claim 1, wherein the providing the input test signal further comprises at least one of:
    providing a known test pattern; and
    providing a pseudo random test pattern.

9. The method of claim 1 further comprises:
    providing the input test signal to the varied multi-gigabit transceiver subsequent to the step of adjusting the programmable operational setting of the multi-gigabit transceiver to produce an adjusted multi-gigabit transceiver;
    monitoring an output of the adjusted multi-gigabit transceiver with respect to the input test signal to determine the level of signal integrity;
    determining whether the level of signal integrity provides the desired performance margin; and
    when the level of signal integrity does not provide the desired performance margin, identifying the multi-gigabit transceiver as failing test or as a reduced operational multi-gigabit transceiver.

10. A multi-gigabit transceiver comprises:
    a transmit physical media attachment module operably coupled to convert parallel input data into serial output data;
    a receive physical media attachment module operably coupled to convert receive serial data into receive parallel data;
    a transmit physical coding sublayer module operably coupled to convert transmit data words into the parallel input data;
    a receive physical coding sublayer module operably coupled to convert the receive parallel data into receive data words; and
    a control module operably coupled to place the multi-gigabit transceiver in a test mode or an operation mode, wherein, when in the test mode, the control module facilitates testing of the multi-gigabit transceiver by:
        configuring the multi-gigabit transceiver for testing;
        varying a performance aspect of the multi-gigabit transceiver to produce a varied multi-gigabit transceiver;
        providing an input test signal to the varied multi-gigabit transceiver;
        monitoring an output of the varied multi-gigabit transceiver with respect to the input test signal to determine a level of signal integrity;
        determining when the level of signal integrity provides a desired performance margin; and
        when the level of signal integrity does not provide the desired performance margin, adjusting a programmable operational setting of the multi-gigabit transceiver.

11. The multi-gigabit transceiver of claim 10, wherein the control module further functions to configure the multi-gigabit transceiver by:
    configuring the transmit physical media attachment module to transmit the input test signal as a serial data stream; and
    coupling an output of the transmit physical media attachment module to an input of the receive physical media attachment module.

12. The multi-gigabit transceiver of claim 10, wherein the control module further functions to vary a performance aspect of the multi-gigabit transceiver by at least one of:
    adding jitter to a clock signal of the receive physical media attachment module;
    changing an output slew rate of the transmit physical media attachment module;
    changing amplitude of the output of the transmit physical media attachment module;
    adjusting equalizer coefficients of an equalizer within the receive physical media attachment module;
    adding power supply noise to a supply voltage source the transmit physical media attachment module or the receive physical media attachment module;
    adding noise to the input test signal;

providing adjacent channel noise on a channel proximal to the coupling of the transmit physical media attachment module to the receive physical media attachment module; and providing load noise on an output of the receive physical media attachment module.

13. The multi-gigabit transceiver of claim 12, wherein the control module further functions to add the jitter to the clock signal by:

adjusting a fractional divider of a phase locked loop during test mode; and setting the fractional divider to an integer value during normal mode.

14. The multi-gigabit transceiver of claim 10, wherein the control module further functions to adjust the programmable operational setting of the multi-gigabit transceiver by at least one of:

adjusting equalization settings of an equalizer within the receive physical media attachment module;

adjusting amplification settings of an amplifier within the receive physical media attachment module; and adjusting a sampling point within a data detection circuit within the receive physical media attachment module.

15. The multi-gigabit transceiver of claim 10, wherein the control module further functions to:

when the level of signal integrity provides the desired performance margin, maintain the programmable operational setting of the multi-gigabit transceiver.

16. The multi-gigabit transceiver of claim 10, wherein the control module further functions to monitor the output of the varied multi-gigabit transceiver by at least one of:

monitoring bit error rate of the receive physical media attachment module; and determining an eye opening of a recovered signal as produced by the receive physical media attachment module.

17. The multi-gigabit transceiver of claim 10, wherein the control module further functions to provide the input test signal by at least one of:

providing a known test pattern; and providing a pseudo random test pattern.

18. The multi-gigabit transceiver of claim 10, wherein the control module further functions to:

provide the input test signal to the varied multi-gigabit transceiver subsequent to the step of adjusting the programmable operational setting of the multi-gigabit transceiver to produce an adjusted multi-gigabit transceiver;

monitor an output of the adjusted multi-gigabit transceiver with respect to the input test signal to determine the level of signal integrity;

determine whether the level of signal integrity provides the desired performance margin; and when the level of signal integrity does not provide the desired performance margin, identify the multi-gigabit transceiver as failing test or as a reduced operational multi-gigabit transceiver.

19. A programmable logic device comprises:

a plurality of multi-gigabit transceivers, wherein each of the multi-gigabit transceiver includes:

a transmit physical media attachment module operably coupled to convert parallel input data into serial output data;

a receive physical media attachment module operably coupled to convert receive serial data into receive parallel data;

a transmit physical coding sublayer module operably coupled to convert transmit data words into the parallel input data; and a receive physical coding sublayer module operably coupled to convert the receive parallel data into receive data words; and a control module operably coupled to place at least one of the plurality of multi-gigabit transceivers in a test mode or an operation mode, wherein, when in the test mode, the control module facilitates testing of the at least one of the plurality of multi-gigabit transceivers by:

configuring the at least one of the plurality of multi-gigabit transceivers for testing;

varying a performance aspect of the at least one of the plurality of multi-gigabit transceivers to produce a varied multi-gigabit transceiver;

providing an input test signal to the varied multi-gigabit transceiver;

monitoring an output of the varied multi-gigabit transceiver with respect to the input test signal to determine a level of signal integrity;

determining when the level of signal integrity provides a desired performance margin; and when the level of signal integrity does not provide the desired performance margin, adjusting a programmable operational setting of the multi-gigabit transceiver.

20. The programmable logic device of claim 19, wherein the control module further functions to configure the at least one of the plurality of multi-gigabit transceivers by:

configuring the transmit physical media attachment module to transmit the input test signal as a serial data stream; and coupling an output of the transmit physical media attachment module to an input of the receive physical media attachment module.

21. The programmable logic device of claim 19, wherein the control module further functions to configure the plurality of multi-gigabit transceivers for testing by:

configuring the transmit physical media attachment module of plurality of multi-gigabit transceivers to transmit the input test signal as a serial data stream; and daisy chain coupling an output of the transmit physical media attachment module of one of the plurality of multi-gigabit transceivers to an input of the receive physical media attachment module of another one of the plurality of multi-gigabit transceivers.

22. The programmable logic device of claim 19, wherein the control module further functions to vary a performance aspect of the at least one of the plurality of multi-gigabit transceivers by at least one of:

adding jitter to a clock signal of the receive physical media attachment module;

changing an output slew rate of the transmit physical media attachment module;

changing amplitude of the output of the transmit physical media attachment module;

adjusting equalizer coefficients of an equalizer within the receive physical media attachment module;

adding power supply noise to a supply voltage source the transmit physical media attachment module or the receive physical media attachment module;

adding noise to the input test signal;

providing adjacent channel noise on a channel proximal to the coupling of the transmit physical media attachment module to the receive physical media attachment module; and providing load noise on an output of the receive physical media attachment module.

23. The programmable logic device of claim 22, wherein the control module further functions to add the jitter to the clock signal by:
   adjusting a fractional divider of a phase locked loop during test mode; and
   setting the fractional divider to an integer value during normal mode.

24. The programmable logic device of claim 19, wherein the control module further functions to adjust the programmable operational setting of the at least one of the plurality of multi-gigabit transceivers by at least one of:
   adjusting equalization settings of an equalizer within the receive physical media attachment module;
   adjusting amplification settings of an amplifier within the receive physical media attachment module; and
   adjusting a sampling point within a data detection circuit within the receive physical media attachment module.

25. The programmable logic device of claim 19, wherein the control module further functions to:
   when the level of signal integrity provides the desired performance margin, maintain the programmable operational setting of the at least one of the plurality of multi-gigabit transceivers.

26. The programmable logic device of claim 19, wherein the control module further functions to monitor the output of the varied multi-gigabit transceiver by at least one of:
   monitoring bit error rate of the receive physical media attachment module; and
   determining an eye opening of a recovered signal as produced by the receive physical media attachment module.

27. The programmable logic device of claim 19, wherein the control module further functions to provide the input test signal by at least one of:
   providing a known test pattern; and
   providing a pseudo random test pattern.

28. The programmable logic device of claim 19, wherein the control module further functions to:
   provide the input test signal to the varied multi-gigabit transceiver subsequent to the step of adjusting the programmable operational setting of the multi-gigabit transceiver to produce an adjusted multi-gigabit transceiver;
   monitor an output of the adjusted multi-gigabit transceiver with respect to the input test signal to determine the level of signal integrity;
   determine whether the level of signal integrity provides the desired performance margin; and
   when the level of signal integrity does not provide the desired performance margin, identify the multi-gigabit transceiver as failing test or as a reduced operational multi-gigabit transceiver.

* * * * *